(12) United States Patent
Kumagai

(10) Patent No.: US 6,244,624 B1
(45) Date of Patent: Jun. 12, 2001

(54) AIR BAG APPARATUS FOR PASSENGER SEAT

(75) Inventor: Koshi Kumagai, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/176,430

(22) Filed: Oct. 21, 1998

(30) Foreign Application Priority Data

Oct. 21, 1997 (JP) .................................................. 9-288738

(51) Int. Cl.$^7$ .................................................. B60R 21/16
(52) U.S. Cl. .................................. 280/743.1; 280/732
(58) Field of Search ............................ 280/743.1, 728.1, 280/732

(56) References Cited

U.S. PATENT DOCUMENTS

| | | | |
|---|---|---|---|
| 5,062,664 | * 11/1991 | Bishop et al. | 280/743.1 |
| 5,178,407 | * 1/1993 | Kelley | 280/728 |
| 5,335,936 | * 8/1994 | Faigle et al. | 280/743.1 |
| 5,382,048 | * 1/1995 | Paxton et al. | 280/728 R |
| 5,425,551 | * 6/1995 | Hawthorn | 280/743.1 |
| 5,538,281 | * 7/1996 | Patercsak | 280/743.1 |
| 5,613,698 | * 3/1997 | Patercsak et al. | 280/728.1 |
| 5,636,861 | * 6/1997 | Orsulak et al. | 280/730.1 |
| 5,873,598 | * 2/1999 | Yoshioka et al. | 280/740 |
| 5,884,939 | * 3/1999 | Yamaji et al. | 280/743.1 |
| 5,957,486 | * 9/1999 | Taguchi et al. | 280/743.1 |

FOREIGN PATENT DOCUMENTS

| | | |
|---|---|---|
| 2-14944 | * 1/1990 | (JP) . |
| 6-127320 | * 5/1994 | (JP) . |
| 6-191362A | * 7/1994 | (JP) . |
| 08040165 | * 2/1996 | (JP) . |
| 8-91166 | 8/1996 | (JP) . |
| 09048318 | * 2/1997 | (JP) . |
| 2709024 | 9/1997 | (JP) . |
| 3036528 | 9/1997 | (JP) . |
| 96/15923 | * 5/1996 | (WO) . |

* cited by examiner

Primary Examiner—Paul N. Dickson
(74) Attorney, Agent, or Firm—Pillsbury Winthrop LLP

(57) ABSTRACT

The air bag includes a bag body, a mouth portion for introducing gas supplied from an inflator into the bag body, and a fixture portion for fixing the air bag to a case. The mouth portion is disposed in a central portion of the case. A vehicle front side portion of the bag body located on the front side of the vehicle relative to the mouth portion and a vehicle rear side portion of the bag body located on the rear side of the vehicle relative to the mouth portion are folded to be accommodated between the mouth portion and front and rear inner faces of the case respectively. Upon activation of the inflator, a passenger facing portion of the bag body that faces the passenger in an ultimate deployment state of the air bag is first deployed to a predetermined extent. Thereafter, due to application of tension forces acting in such a direction as to deploy the air bag, the other portions of the bag body that are in their folded states are deployed toward the vehicle front and rear sides respectively.

7 Claims, 10 Drawing Sheets

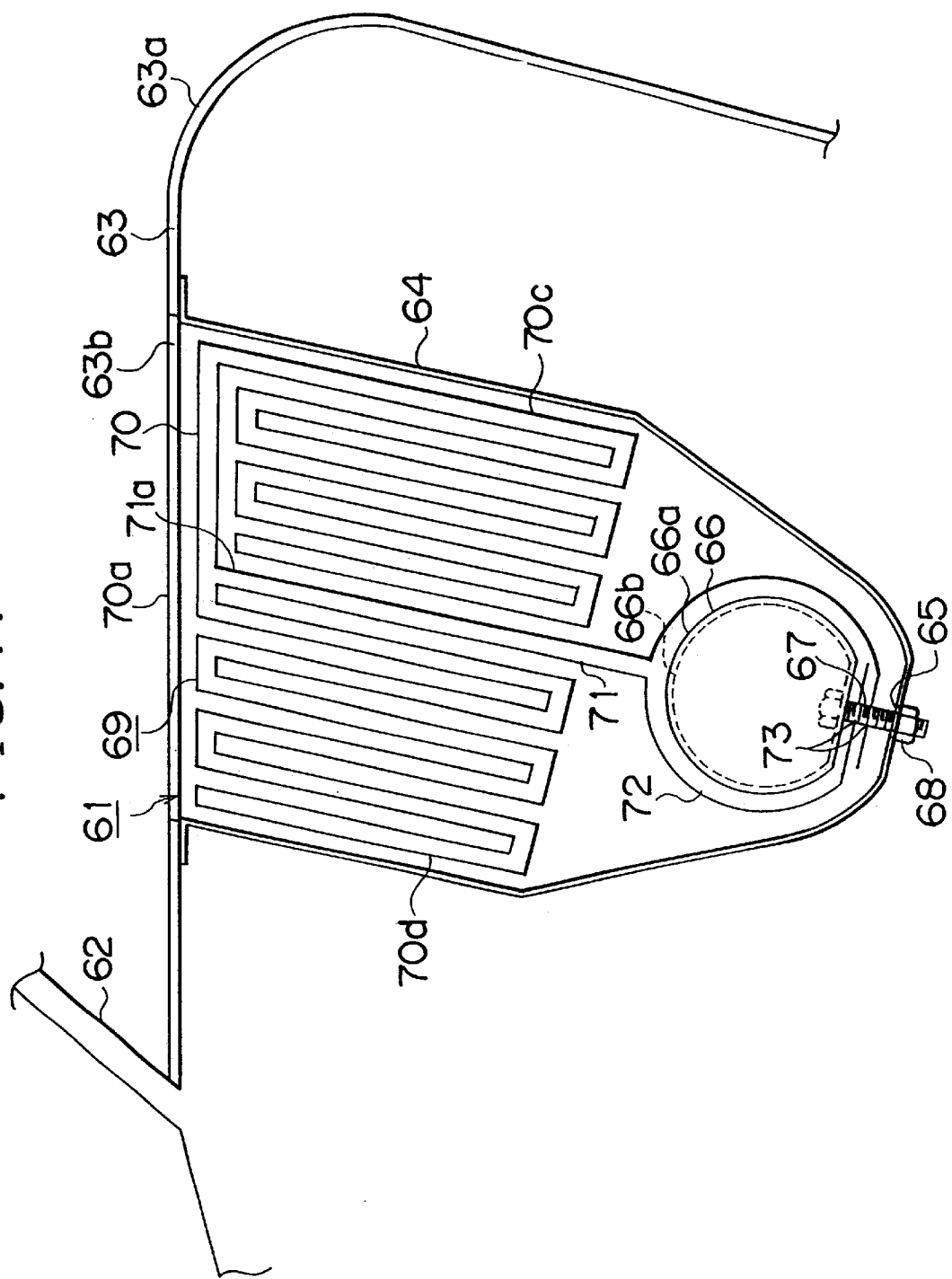

AIR BAG APPARATUS FOR PASSENGER SEAT

INCORPORATION BY REFERENCE

The disclosure of Japanese Patent Application No. HEI 9-288738 filed on Oct. 21, 1997 including the specification, drawings and abstract is incorporated herein by reference in its entirety.

BACKGROUND OF THE INVENTION

1. Field of the Invention

The present invention relates to an air bag apparatus installed in an instrument panel of a vehicle such as an automobile to protect a passenger, a method of folding an air bag of the air bag apparatus, and a method of deploying the air bag.

2. Description of the Related Art

Japanese Patent Application Laid-Open No. HEI 6-127320 and Japanese Patent Application Laid-Open No. HEI 6-191362 disclose air bag apparatus for a passenger seat.

HEI 6-127320 discloses an air bag having an opening portion, a winding portion adjacent to the opening portion, and a folded portion adjacent to the winding portion and folded into a predetermined shape. The opening portion of the air bag is attached to a case. The folded portion is wound by the winding portion counterclockwise as viewed from the right side of the vehicle so as to be accommodated in the case. The thus-constructed air bag apparatus ensures that upon activation of an inflator, the air bag is first deployed upwards along a wind shield and then rearwards and downwards so as to attenuate an impact made on a passenger.

HEI 6-191362 discloses an air bag arrangement in which an inflator is disposed within a case at a location biased toward a bottom wall and a front wall of the case. The inflator has two gas ejection ports formed in an outer periphery thereof, and those gas ejection ports are opposed to each other. The gas ejected from one of the gas ejection ports moves diagonally upwards from the front wall side of the case, whereas the gas ejected from the other gas ejection port moves diagonally downwards from the rear wall side of the case. An air bag in its folded state is accommodated between the inflator and the rear wall of the case. The thus-constructed air bag apparatus, upon activation of the inflator, will deploy upper and lower portions of the air bag upwards and downwards, respectively earlier than a central portion thereof, whereby the air bag assumes its ultimate shape relatively early in the process of deployment.

However, these air bag apparatus encounter the following problems.

In the HEI 6-127320 arrangement, upon activation of the inflator, the folded portion of the air bag pops out of the case without being unfolded and deployed upwards. If the folded portion comes into contact with a passenger while the air bag is still being deployed, the folded portion rubs against the passenger in accordance with a deployment process of the folded portion.

In the HEI 6-191362 arrangement, upon activation of the inflator, the upper and lower portions of the air bag are deployed while the central portion thereof remains as it is. If a wrinkled central rear face portion of the air bag comes into contact with the passenger while the air bag is still being deployed, the air bag also rubs against the passenger.

SUMMARY OF THE INVENTION

The present invention has been made in an effort to overcome some of the problems remaining in this art. Accordingly, it is an object of the present invention to provide an air bag apparatus for protecting a passenger in the front seat of a vehicle, a method of folding an air bag and a method of deploying the air bag that decreases the amount that the air bag rubs against the passenger even if the air bag comes into contact with the passenger while the air bag is being deployed.

To achieve the aforementioned object, a first aspect of the present invention provides an air bag apparatus for a front seat passenger. The air bag arrangement is disposed in an instrument panel on the passenger seat side of the vehicle in a compartment. An inflator supplies gas to the air bag, causing it to deploy. The air bag is folded such that when it deploys due to activation of the inflator, a passenger facing portion of the air bag that faces a passenger in an ultimate deployment state of the air bag is deployed earlier than other portions of the air bag.

During the initial stage of a deployment process of the air bag, only the passenger facing portion of the air bag is first deployed so that it assumes a wrinkleless tensioned state. Thus, even if the passenger facing portion of the air bag comes into contact with the passenger while the air bag is still being deployed, the amount that the air bag rubs against the passenger is decreased. This is because the passenger facing portion of the air bag has already been deployed completely.

Furthermore, the air bag apparatus according to the first aspect of the present invention may be modified by folding the air bag such that the portions of the air bag other than the passenger facing portion are deployed due to application of tension forces acting substantially in such a direction as to deploy the air bag.

The other portions of the air bag are deployed due to application of tension forces acting substantially in such a direction as to deploy the air bag, after the passenger facing portion of the air bag has been deployed. Thus, those portions constituting the air bag move toward the passenger in accordance with the sequence in which they are deployed. Thus, the air bag will not pop out of its compartment without being unfolded. Even if the air bag comes into contact with the passenger, it will not rub against the passenger.

A second aspect of the present invention can be achieved by modifying a known air bag apparatus according to the first aspect of the present invention as follows. An air bag includes a bag body that is deployed due to activation of the inflator, a mouth portion for introducing gas supplied from the inflator into the bag body, and a fixture portion for fixing the air bag to the case. The mouth portion is disposed in a central portion of the case. Finally, a vehicle front side portion of the bag body located on the front side of the vehicle relative to the mouth portion and a vehicle rear side portion of the bag body located on the rear side of the vehicle relative to the mouth portion are folded so as to be accommodated between the mouth portion and front and rear inner faces of the case, respectively.

Gas ejected from the inflator is introduced into the bag body while stretching out the mouth portion of the air bag toward the front and rear inner faces of the case. Then, the vehicle front side portion of the air bag and the vehicle rear side portion of the air bag, which are in their folded states, are pushed against the inner face of the case. Because of frictional resistance generated therebetween, tension forces are applied to the vehicle front and rear side portions of the air bag when those portions are pulled out. Thus, while the air bag is still being deployed, the formation of wrinkles on the bag body is prevented. In addition, the rate at which the air bag is deployed toward the passenger is suitably reduced.

Furthermore, the air bag apparatus according to the second aspect of the present invention can be modified as follows. That is, as regards the vehicle front side portion of the bag body and the vehicle rear side portion of the bag body, at least the vehicle rear side portion of the bag body is roll-bent such that a front end thereof is drawn toward the mouth portion. Frictional resistance generated at the time of deployment of the bag body increases, so that the vehicle rear side portion of the bag body is slowly deployed. Even in the case where the air bag apparatus is disposed to face upwards, the air bag can be deployed toward the passenger. In this manner, it is possible to enhance the capability to restrain the movement of the passenger. In addition, it is also possible to prevent the formation of wrinkles.

Furthermore, the air bag apparatus according to the second aspect of the present invention may be modified as follows. That is, the vehicle front side portion of the bag body and the vehicle rear side portion of the bag body are roll-bent such that respective front ends thereof are drawn toward the mouth portion.

In this construction, while the air bag is being deployed, a frictional force acts against the deployment of the bag body. Besides, the vehicle front and rear side portions of the bag body are sequentially deployed from the outsides thereof. Accordingly, it is possible to prevent the formation of wrinkles and to further reduce the rate at which the entire bag body is deployed.

Moreover, the air bag apparatus according to the second aspect of the present invention may be modified as follows. That is, the number of roll-bending the vehicle rear side portion of the bag body can be set larger than the number of roll-bending the vehicle front side portion of the bag body.

In this construction, after the deployment of the passenger facing portion of the bag body, the vehicle front side portion thereof is smoothly deployed toward the passenger without generating any wrinkles. As is the case with the aforementioned constructions, it is possible to decrease the amount that the air bag rubs against the passenger and to substantially enhance the capability to restrain the movement of the passenger.

In addition, the air bag apparatus according to the second aspect of the present invention may be modified as follows. The case is disposed on the vehicle front side of the instrument panel, and the vehicle front side portion of the bag body can be set longer than the vehicle rear side portion of the bag body such that the amount of the vehicle front side portion of the bag body folded for accommodation becomes larger than the amount of the vehicle rear side portion of the bag body folded for accommodation.

In this construction, even in the case where the air bag apparatus is disposed in an upper portion of the instrument panel, it is possible to ensure a long displacement stroke of the vehicle front side portion of the bag body. Thus, it is certain that the passenger facing portion of the air bag is displaced toward the passenger substantially horizontally. Even if the passenger facing portion of the air bag comes into contact with the passenger while the air bag is still being deployed, it is possible to decrease the amount that the air bag rubs against the passenger.

A third aspect of the present invention provides a method of folding an air bag of an air bag apparatus disposed in an instrument panel on the side of a passenger seat in a vehicle compartment, wherein the air bag is folded such that a passenger facing portion of the air bag that faces a passenger in an ultimate deployment state of the air bag is deployed earlier than other portions of the air bag.

A fourth aspect of the present invention provides a method of deploying an air bag for a passenger seat of a vehicle, wherein a passenger facing portion of the air bag that faces a passenger in an ultimate deployment state of the air bag is first deployed from an opening provided on the vehicle front side of an instrument panel due to application of a tension force acting in a fore-to-aft direction of the vehicle, and wherein a vehicle front side portion of the air bag and a vehicle rear side portion of the air bag, which are adjacent to the passenger facing portion, are thereafter deployed from the opening due to application of tension forces acting substantially in such a direction as to deploy the air bag.

According to third and fourth aspects of the present invention as well as the first aspect of the present invention, during the initial stage of deployment of the air bag, only the passenger facing portion thereof is first deployed in a wrinkleless tensioned state. Thus, even if the passenger facing portion of the air bag comes into contact with the passenger while the air bag is still being deployed, the amount that the air bag rubs against the passenger is decreased. This is because the passenger facing portion of the air bag has already been deployed completely.

BRIEF DESCRIPTION OF THE DRAWINGS

The foregoing and further objects, features and advantages of the present invention will become apparent from the following description of preferred embodiments with reference to the accompanying drawings, wherein:

FIG. 17 is a schematic sectional view of an air bag apparatus according to another embodiment of the present invention.

DETAILED DESCRIPTION OF THE PREFERRED EMBODIMENTS

Preferred embodiments of the present invention will hereinafter be described in detail with reference to FIGS. 1 through 16.

Figure 1:
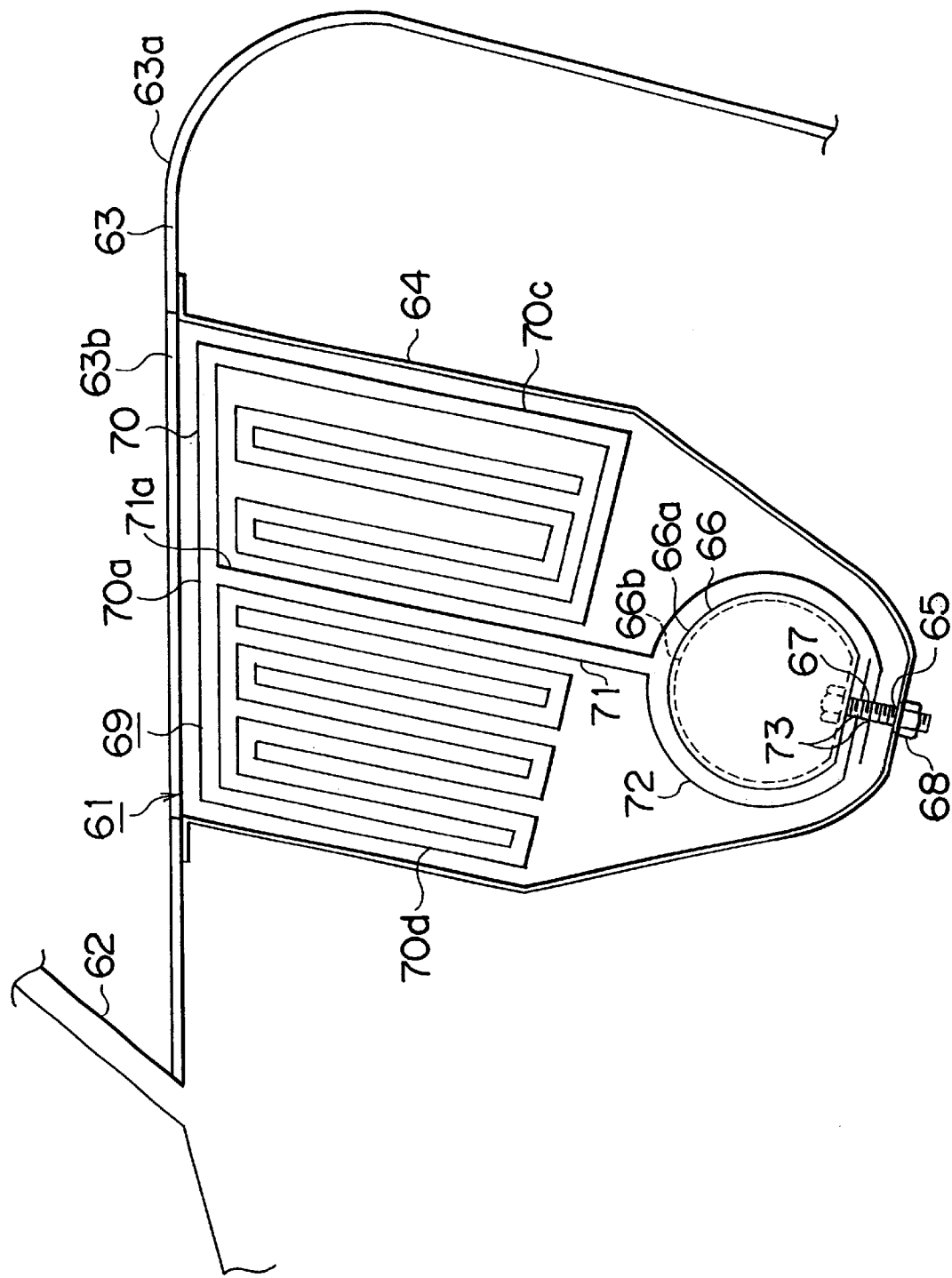
FIG. 1 is a schematic sectional view of an air bag apparatus for a passenger seat according to an embodiment of the present invention.
Figure 2:
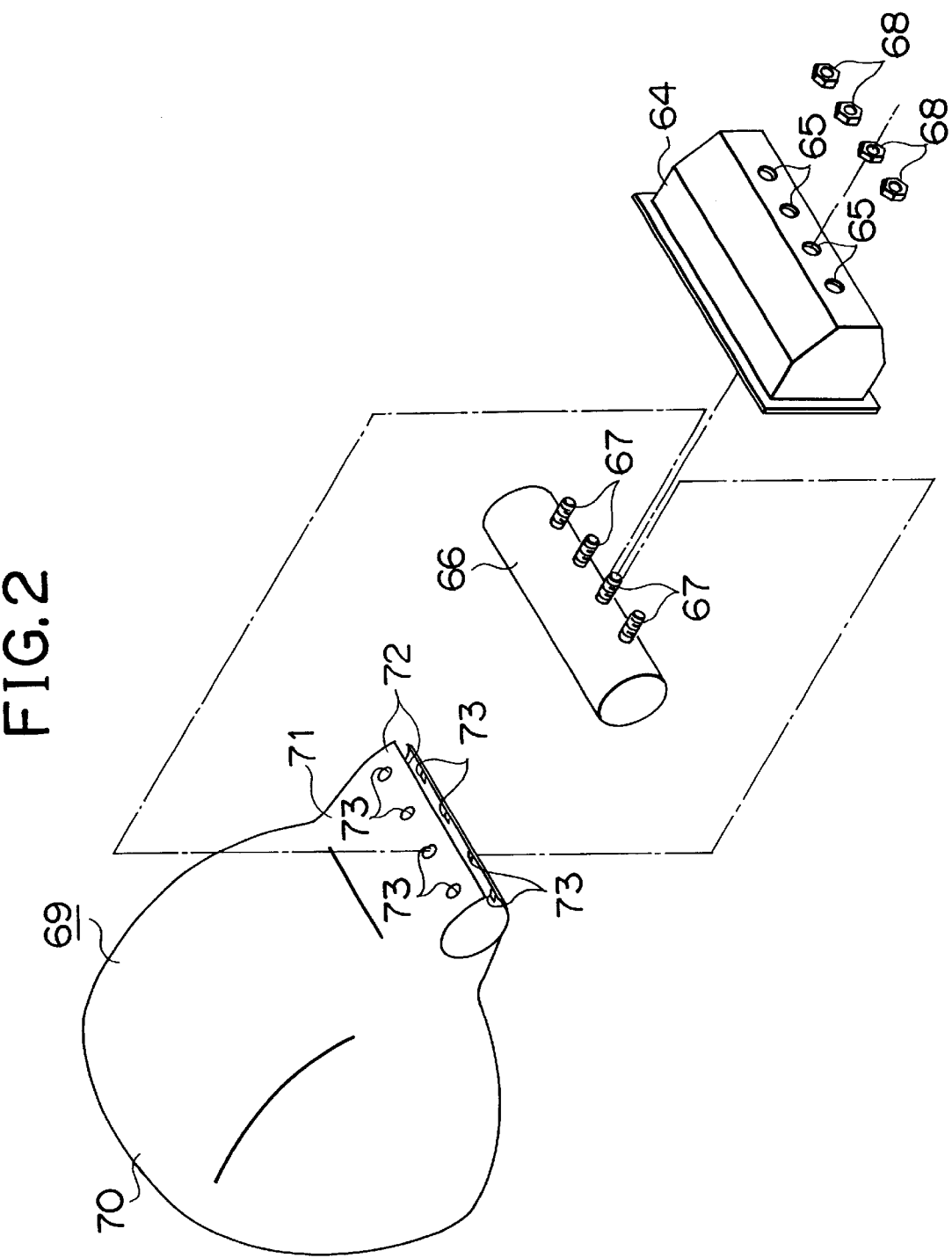
FIG. 2 is an exploded perspective view of the air bag apparatus.

As illustrated in FIGS. 1 and 2, an air bag apparatus 61 for a passenger seat according to the present embodiment is securely disposed in an upper portion of an instrument panel 63 that faces a wind shield 62, in a vehicle such as an automobile or the like. The instrument panel 63 has a surface skin 63a and a cover 63b for covering the air bag apparatus 61. A case 64 of the air bag apparatus 61 is approximately in the shape of a box having an upper opening. A plurality of insertion holes 65 are formed through a bottom face of the case 64. An inflator 66 for injecting gas is disposed within the case 64, and a plurality of screws 67 protrude from an outer surface of the inflator 66. By inserting the screws 67 into the insertion holes 65 and screwing nuts 68 into the respective screws 67, the inflator 66 is fixed within the case 64. The inflator 66 contains gas generating agent (not shown). Upon collision of the vehicle, the gas generating agent is subjected to heat decomposition, and the thus-decomposed gas is ejected from gas ejection ports 66b of an inflator case 66a. The gas ejection ports 66b are formed in an upper center portion of the inflator case 66a at predetermined intervals.

In the case 64, an air bag 69 folded into a predetermined shape is disposed opposite to the inflator 66. The air bag 69 is continuously composed of a bag body 70, a mouth portion 71 for introducing gas supplied from the gas ejection port 66b into the bag body 70, and a fixture portion 72 for fixing the air bag 69 to the case 64. The mouth portion 71 is disposed opposite to the gas ejection port 66b of the inflator 66. A plurality of insertion holes 73 are formed through the fixture portion 72. In fixing the inflator 66 to the case 64, the screws 67 protruding from the inflator 66 are inserted into the insertion holes 73, whereby the fixture portion 72 of the air bag 69 is securely clamped between the inflator 66 and the case 64.

The air bag 69 must be folded before it is put into the case 64. Thus, a method of folding the air bag 69 will hereinafter be described.

Figure 3:
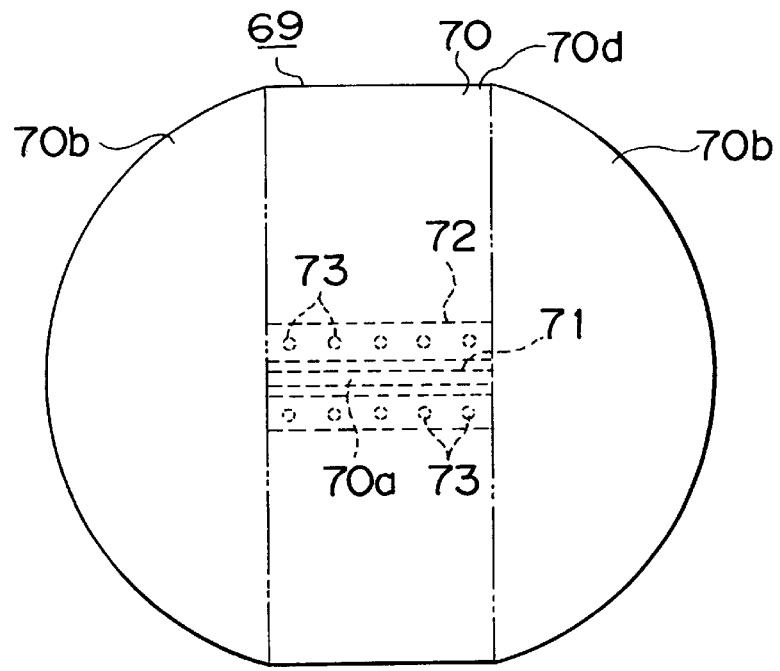
FIG. 3 is a rear face view illustrating a first process of folding an air bag.
Figure 4:
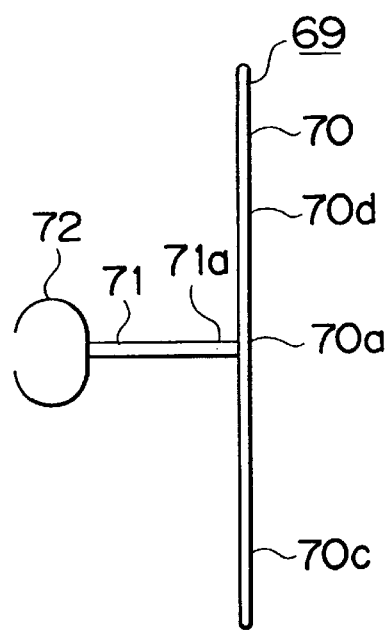
FIG. 4 is a lateral view corresponding to FIG. 3, illustrating the first process of folding the air bag.
Figure 5:
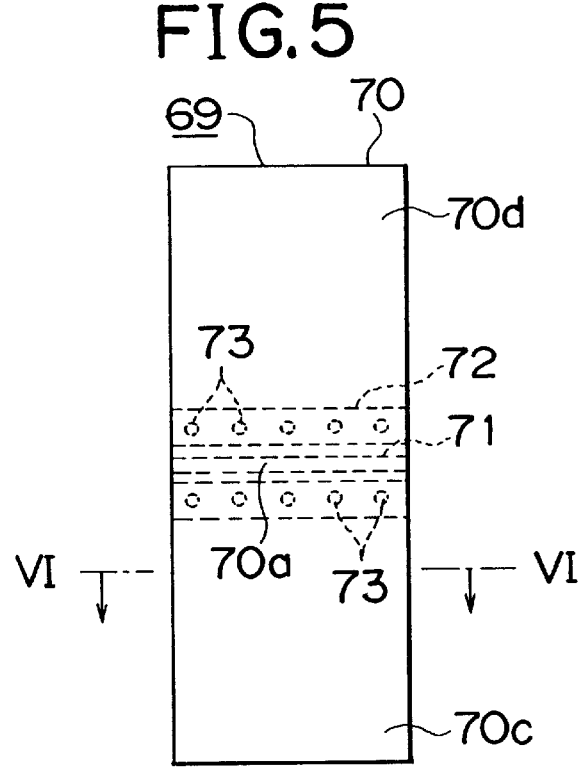
FIG. 5 is a rear face view illustrating a second process of folding the air bag.
Figure 6:
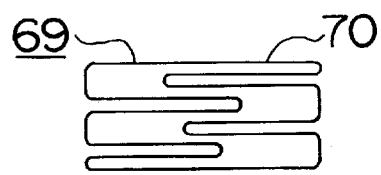
FIG. 6 is a sectional view taken along line VI—VI in FIG. 5, illustrating the second process of folding the air bag.

First of all, as illustrated in FIGS. 3 and 4, the bag body 70 and the mouth portion 71 have been crushed into a flat shape, so that the flank of the entire air bag 69 substantially assumes a shape of T. In this state, a central rear face portion 70a of the bag body 70 is connected with a bag body side end portion 71a of the mouth portion 71. As illustrated in FIGS. 5 and 6, the bag body 70 of the air bag 69 has two side portions 70b extending outwards beyond the longitudinal dimension of the inflator 66. Then, the side portions 70b are alternately folded toward the center of the bag body 70. In this state, as is apparent from FIG. 6, the bag body 70 has a strap-like cross section substantially in the shape of bellows.

Figure 7:
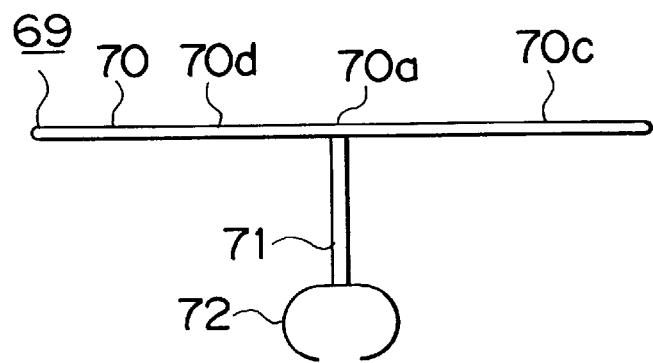
FIG. 7 is a lateral view illustrating a third process of folding a lower portion of the air bag.
Figure 8:
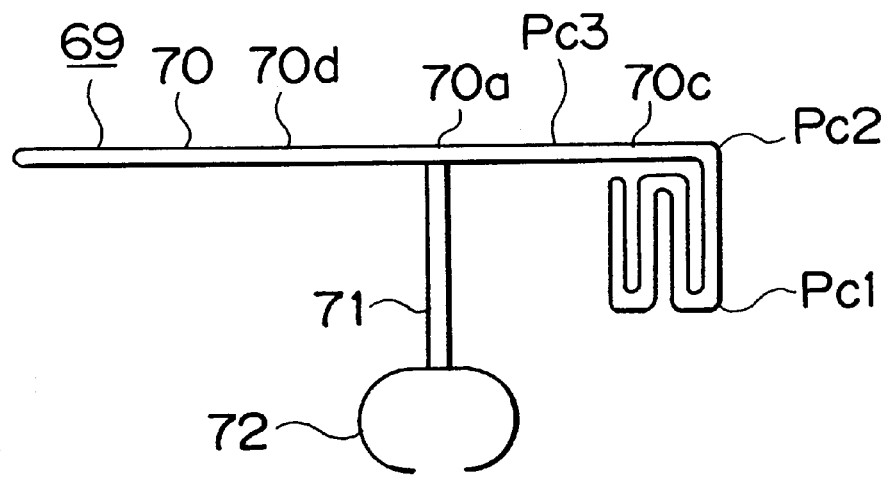
FIG. 8 is a lateral view illustrating the third process of folding the lower portion of the air bag, in a step subsequent to a state shown in FIG. 7.
Figure 9:
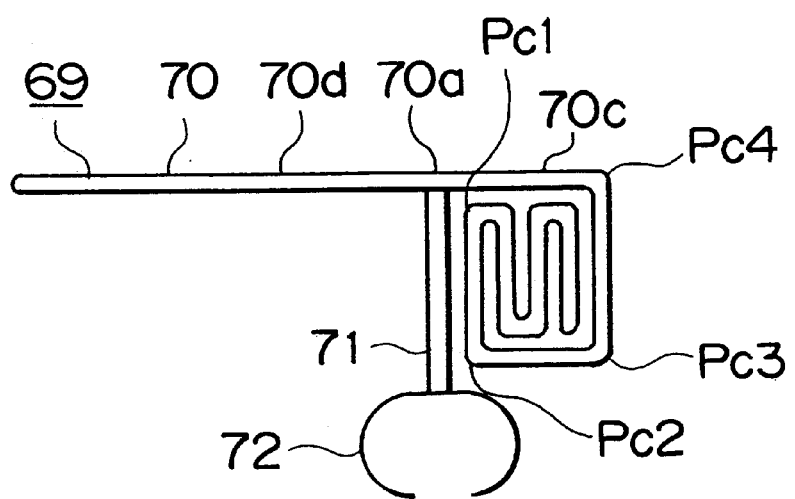
FIG. 9 is a lateral view illustrating the third process of folding the lower portion of the air bag, in a step subsequent to a state shown in FIG. 8.
Figure 10:
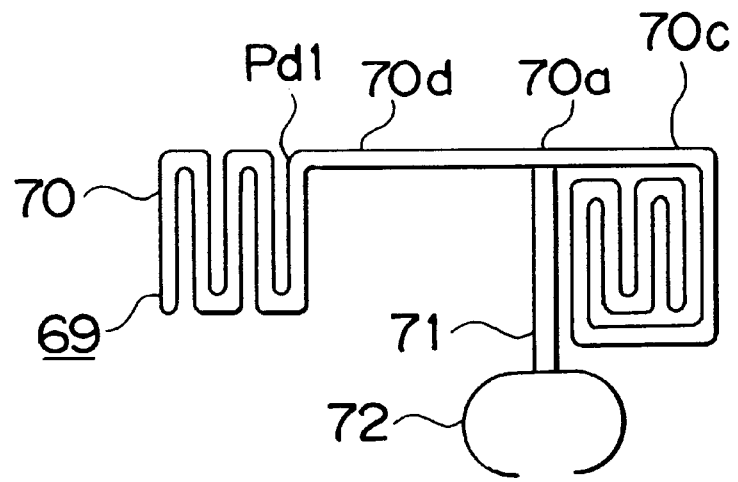
FIG. 10 is a lateral view illustrating the third process of folding an upper portion of the air bag.
Figure 11:
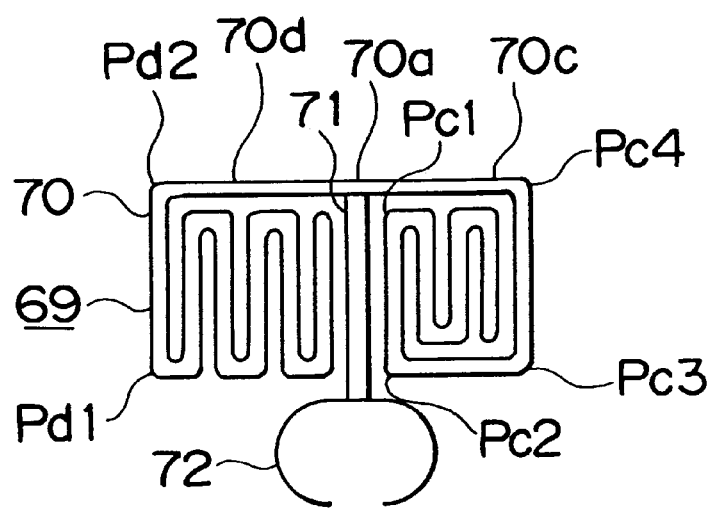
FIG. 11 is a lateral view illustrating the third process of folding the upper portion of the air bag, in a step subsequent to a state shown in FIG. 10.

Starting from the folded state shown in FIG. 7, a lower portion 70c of the aforementioned strap-like bag body 70 is folded a predetermined number of times into the shape of bellows, as can be seen from FIG. 8. The thus-folded lower portion 70c is thereafter roll-bent clockwise as viewed from the left side of the vehicle such that a front end thereof is drawn toward the mouth portion 71, whereby a state shown in FIG. 9 is achieved. Then, an upper portion 70d of the strap-like bag body 70 is folded into the shape of bellows, as can be seen from FIG. 10. The thus-folded upper portion 70d is thereafter roll-bent counterclockwise as viewed from the left side of the vehicle such that a front end thereof is drawn toward the mouth portion 71, whereby a state shown in FIG. 11 is achieved. In this case, the lower portion 70c of the bag body 70 is roll-bent four times by 90° at positions Pc1 through Pc4, while the upper portion 70d of the bag body 70 is roll-bent twice by 90° at positions Pd1 and Pd2. In this manner, the number of roll-bending the lower portion 70c of the bag body 70 is set larger than the number of roll-bending the upper portion 70d of the bag body 70. When upper and lower sections of the air bag apparatus are mentioned in the present specification, they respectively refer to upper and lower sections of the air bag 69 that is in a state of deployment. Accordingly, when the air bag 69 has been deployed, the lower portion 70c of the bag body 70 is located on the lower side of the vehicle, and the upper portion 70d of the bag body 70 is located on the upper side of the vehicle. The upper portion 70d of the bag body 70 is slightly longer than the lower portion 70c of the bag body 70. Consequently, when the air bag 69 is in its folded state, the amount of the upper portion 70d folded to be accommodated in the case 64 is slightly larger than the amount of the lower portion 70c folded to be accommodated in the case 64.

As illustrated in FIGS. 1 and 2, the fixture portion 72 of the air bag 69 is thereafter wound around the inflator 66, and the screws 67 protruding from the inflator 66 are inserted into the insertion holes 73 of the fixture portion 72. In this state, the inflator 66 and the air bag 69 are put into the case 64, and the screws 67 are inserted into the insertion holes 65 of the case 64 and clamped by the nuts 68. Thus, the inflator 66 and the air bag 69 are securely accommodated in the case 64.

In this state, as illustrated in FIG. 1, the mouth portion 71 of the air bag 69 is extensively disposed in a central portion of the case 64. The central rear face portion 70a of the bag body 70 of the air bag 69 is located close to the bag body side end portion 71a of the mouth portion 71 and extensively disposed at the center of an opening portion of the case 64. The lower and upper portions 70c and 70d of the bag body 70, which are in the aforementioned folded states, are disposed between the mouth portion 71 and front and rear inner faces of the case 64 respectively. Upon activation of the inflator 66, the central rear face portion 70a of the bag body 70 is first deployed to a predetermined extent. Simultaneously, due to the application of tension forces, the lower and upper portions 70c and 70d of the bag body 70 are deployed toward the lower and upper sides of the vehicle respectively.

The operation of the thus-constructed air bag apparatus 61 for a passenger seat will hereinafter be described.

If the inflator 66 generates gas upon collision of the vehicle, the gas is ejected from the gas ejection port 66b and introduced into the bag body 70 through the mouth portion 71. At first, as illustrated in FIG. 1, the mouth portion 71 has been crushed into a flat shape. Therefore, the gas stagnates at an inlet of the mouth portion 71 and increases in pressure, thus urging the mouth portion 71 toward the opening portion of the case 64. However, since the mouth portion 71 is elongated from the inflator 66 without slack, there is no possibility of the mouth portion 71 being extruded from the opening portion of the case 64.

Figure 12:
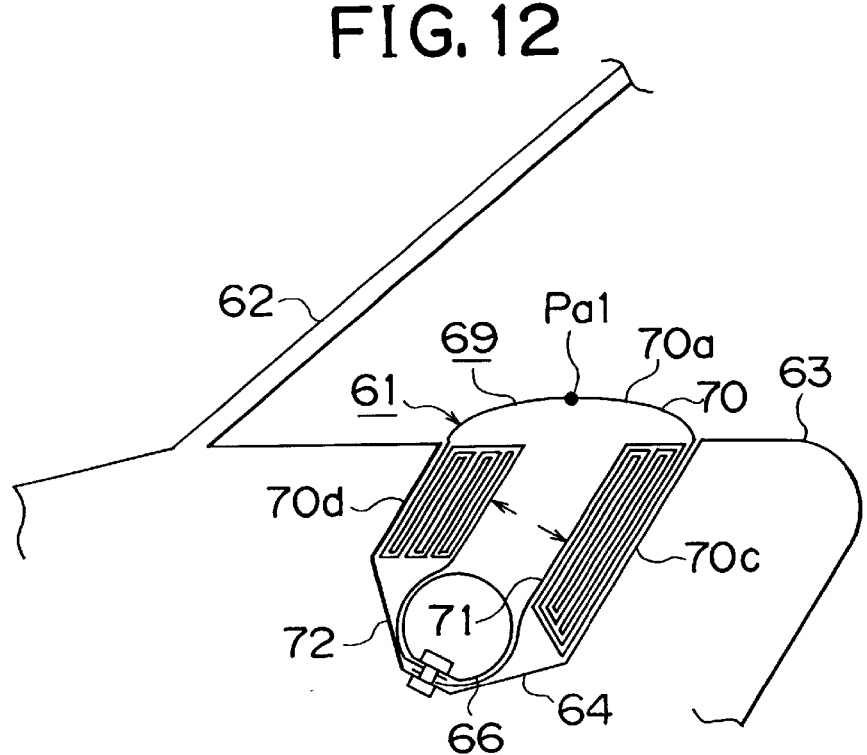
FIG. 12 is a schematic sectional view illustrating an initial deployment state of the air bag apparatus.

As a result, the mouth portion 71 expands in a direction indicated by an arrow in FIG. 12 due to the high-pressure gas supplied from the inflator 66, so that an introduction passage is formed inside the mouth portion 71. Due to the expansion of the mouth portion 71, the lower and upper portions 70c and 70d of the bag body 70 are pushed against the inner face of the case 64. As described hereinbefore, the lower and upper portions 70c and 70d of the bag body 70, which are in their folded states, are disposed between the mouth portion 71 and the front and rear inner faces of the case 64 respectively. The gas supplied from the inflator 66 is then introduced into the bag body 70 through the introduction passage formed inside the mouth portion 71. As illustrated in FIG. 12, only the central rear face portion 70a of the bag body 70 is first stretched out to a wrinkleless tensioned state. The deployment of the air bag 69 is then started, while the cover portion 63b (not shown) of the instrument panel 63 is released.

In this manner, as the gas is introduced into the bag body 70, the inner pressure in the bag body 70 increases and the tension force applied to a base fabric constituting the bag body 70 increases. The tension force operates to pull the lower and upper portions 70c and 70d of the bag body 70, which are disposed between the mouth portion 71 and the front and rear inner faces of the case 64 respectively, out of the case 64. However, since the lower and upper portions 70c and 70d of the bag body 70 are pushed against the inner face of the case 64 due to the expansion of the mouth portion 71, there is generated a frictional resistance therebetween. Accordingly, the lower and upper portions 70c and 70d of the bag body 70 cannot be pulled out beyond a certain extent.

Figure 13:
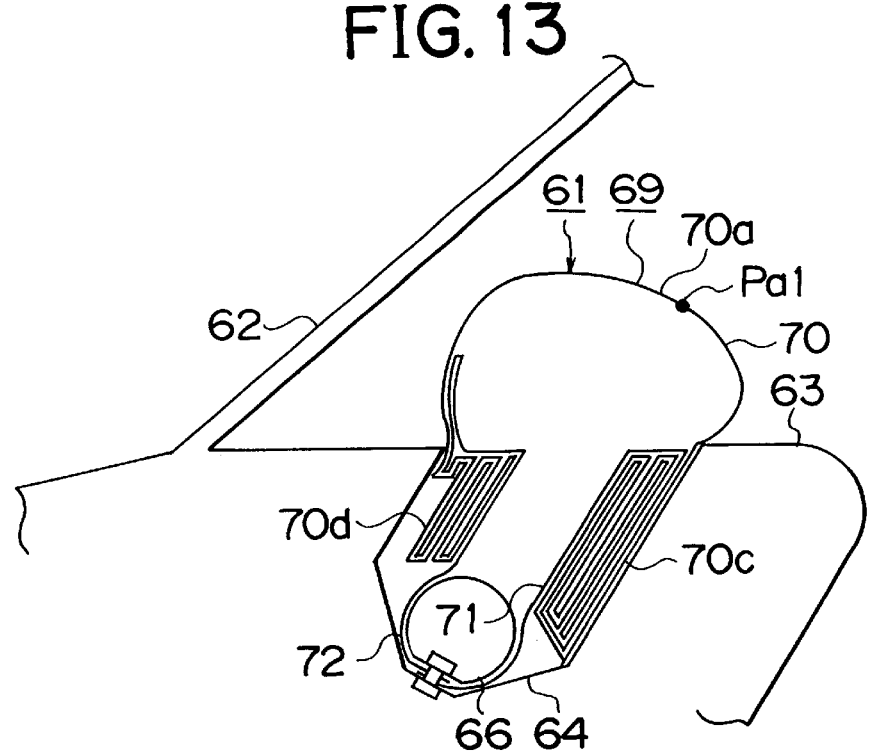
FIG. 13 is a schematic sectional view illustrating a deployment state of the air bag apparatus subsequent to the state shown in FIG. 12.

If the aforementioned tension force thereafter becomes larger than the frictional resistance, the lower and upper portions 70c and 70d of the bag body 70 are sequentially pulled out of the case 64 and deployed, whereby a state shown in FIG. 13 is achieved. In this case, since the base fabric constituting the deployment portion of the bag body 70 invariably receives a tension force, no wrinkles are generated on the deployment portion of the bag body 70.

Figure 14:
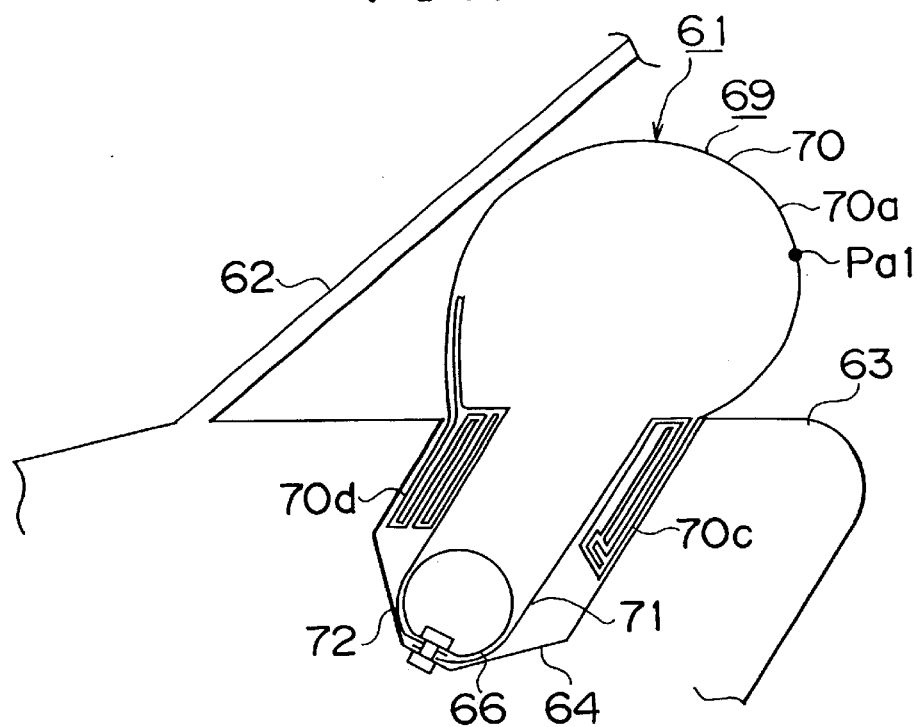
FIG. 14 is a schematic sectional view illustrating a deployment state of the air bag apparatus subsequent to the state shown in FIG. 13.
Figure 15:
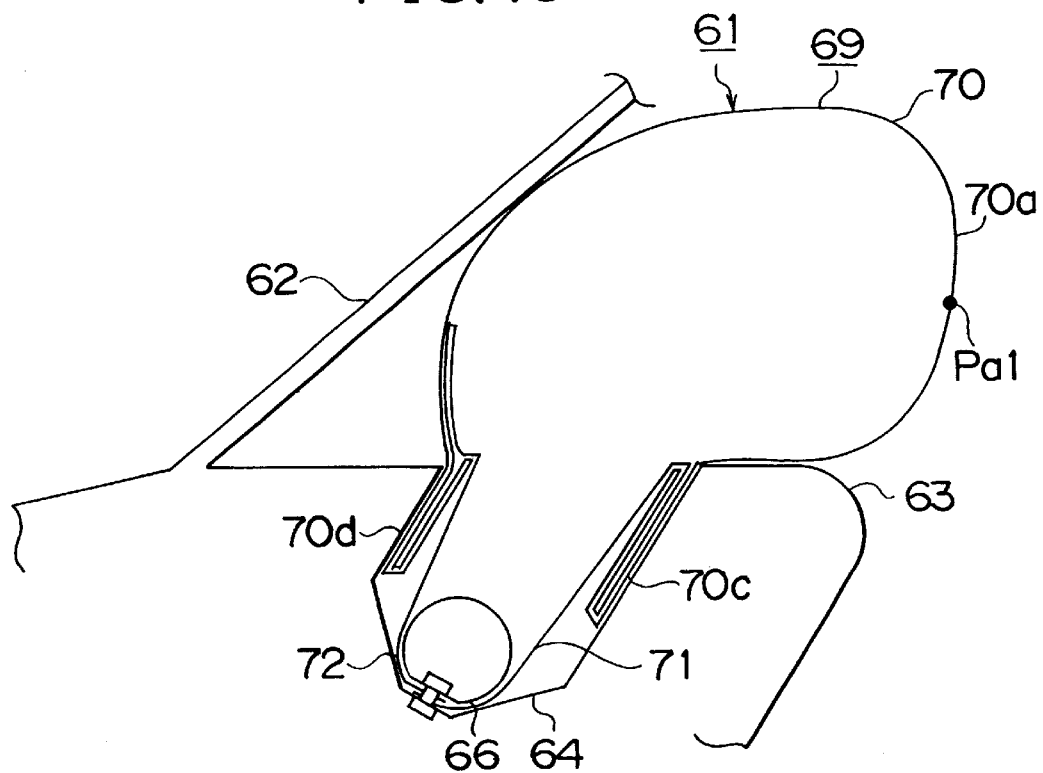
FIG. 15 is a schematic sectional view illustrating a deployment state of the air bag apparatus subsequent to the state shown in FIG. 14.

Furthermore, the number of roll-bending the lower portion 70c of the bag body 70 is set larger than the number of roll-bending the upper portion 70d of the bag body 70. Thus, there is generated a larger frictional resistance on the side of the lower portion 70c than on the side of the upper portion 70d. As a result, as illustrated in FIGS. 13 through 15, the lower portion 70c of the bag body 70 is deployed more slowly than the upper portion 70d of the bag body 70. During the initial stage of deployment, the air bag 69 leans downwards. As the air bag 69 leans downwards, a contact point Pa1, where the central rear face portion 70a of the bag body 70 comes into contact with a passenger, is gradually displaced downwards as well as rearwards.

Figure 16:
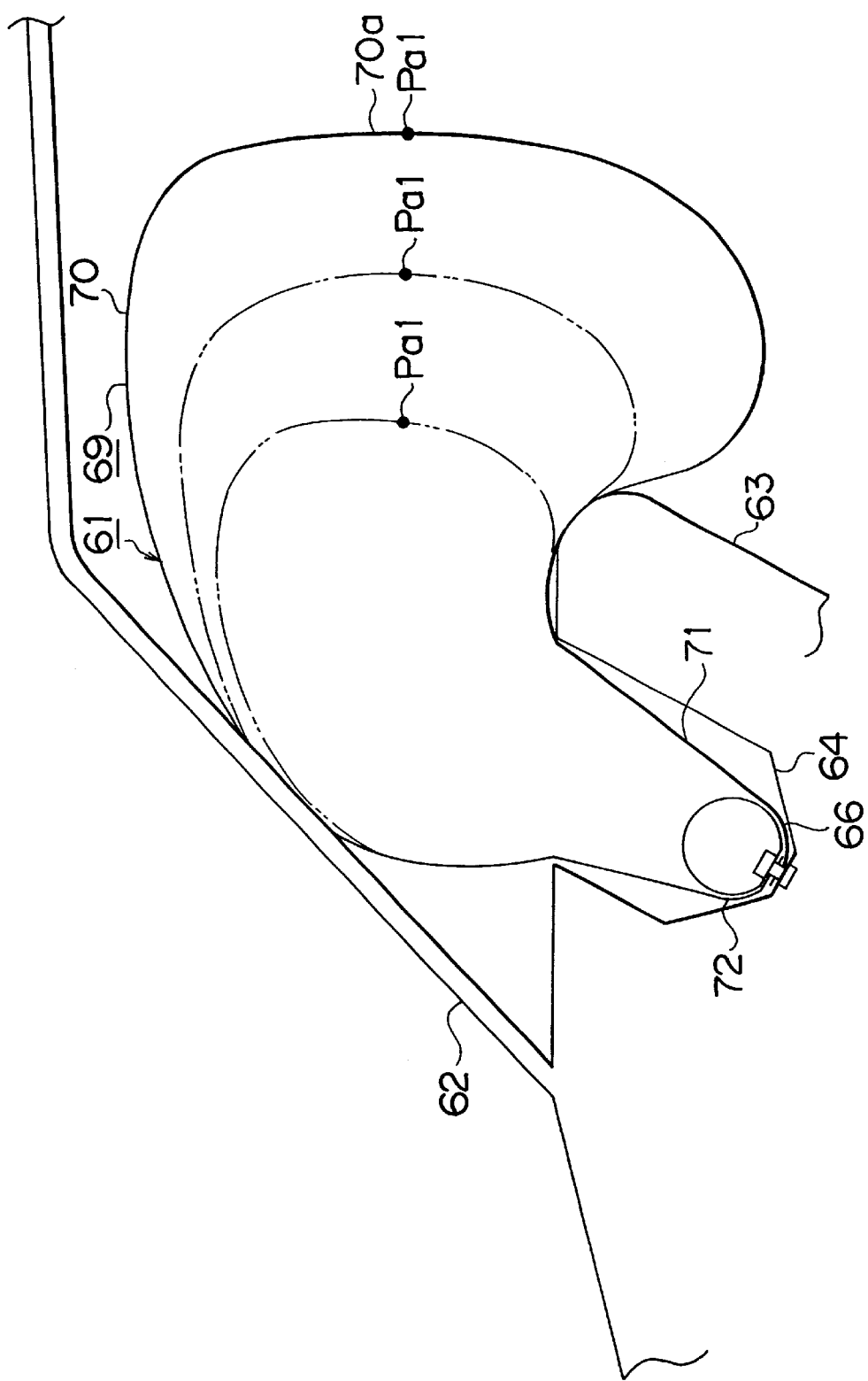
FIG. 16 is a schematic sectional view illustrating a deployment state of the air bag apparatus subsequent to the state shown in FIG. 15.

As illustrated in FIG. 16, when the central rear face portion 70a of the bag body 70 is displaced further rearwards beyond a rear edge of the instrument panel 63 until the bag body 70 assumes its ultimate shape after completion of the deployment, the aforementioned contact point Pa1 is displaced rearwards substantially horizontally without moving vertically. This is because the amount of the upper portion 70d of the bag body 70 folded to be accommodated in the case 64 is slightly larger than the amount of the lower portion 70c of the bag body 70 folded to be accommodated in the case 64. Besides, no wrinkles can be observed on the deployment portion of the bag body 70 including the central rear face portion 70a. Thus, even if the central rear face portion 70a of the bag body 70 comes into contact with the passenger in the vicinity of the contact point Pa1 while the air bag 69 is still being deployed, the air bag 69 does not rub against the passenger.

The effects expected from the thus-constructed embodiment will now be described.

In the present embodiment, upon activation of the inflator 66, the central rear face portion 70a of the air bag 69 is first deployed. Thus, even if the central rear face portion 70a of the air bag 69 comes into contact with the passenger while the air bag 69 is still being deployed, it is possible to decrease the amount the air bag 69 rubs against the passenger. This is because the central rear face portion 70a has already been deployed completely. That is, a tension force is applied to the central rear face portion 70a and no wrinkles can be observed thereon.

The present embodiment is designed such that after the deployment of the central rear face portion 70a, the other portions of the air bag 69 that are in their folded states are deployed due to the application of tension forces. Accordingly, there is no possibility of the air bag 69 in its folded state sticking out toward the passenger. In other words, even if the central rear face portion 70a of the air bag 69 comes into contact with the passenger while the air bag 69 is still being deployed, the respective portions constituting the air bag 69 stick out toward the passenger in accordance with the sequence in which they are deployed. As a result, there is no possibility of the air bag 69 in its folded state coming into contact with the passenger. This decreases the amount that the air bag 69 rubs against the passenger.

In this embodiment, the mouth portion 71 of the air bag 69 is disposed in the central portion of the case 64, and the lower and upper portions 70c and 70d of the bag body 70, which are in their folded states, are disposed between the mouth portion 71 and the front and rear inner faces of the case 64 respectively. Thus, when the mouth portion 71 of the air bag 69 is stretched out due to the gas supplied from the inflator 66, the lower and upper portions 70c and 70d of the bag body 70, which is in its folded state, are pushed against the inner face of the case 64. When those portions are pulled out, tension forces resulting from friction are applied thereto. Accordingly, it is possible to prevent wrinkles from being generated on the bag body 70 while it is still being deployed. As described previously, it is thus possible to decrease the amount that the air bag 69 rubs against the passenger. Furthermore, because of the aforementioned friction, it is also possible to reduce the rate at which the air bag 69 is deployed toward the passenger and to attenuate the impact made on the passenger.

The lower and upper portions 70c and 70d of the bag body 70, which are in their folded states, are disposed between the mouth portion 71 and the front and rear inner faces of the case 64 respectively. In addition, the lower portion 70c is roll-bent clockwise as viewed from the left side of the vehicle, while the upper portion 70d is roll-bent counterclockwise as viewed from the left side of the vehicle. For this reason, a frictional force acts against the deployment of the bag body 70, whereby each of the lower and upper portions 70c and 70d is deployed from the outside thereof. Accordingly, it is possible to prevent the formation of wrinkles and to further reduce the rate at which the entire bag body 70 is deployed.

The lower and upper portions 70c and 70d of the bag body 70, which are in their folded states, are disposed between the mouth portion 71 and the front and rear inner faces of the case 64 respectively. The number of roll-bending the lower portion 70c is set larger than the number of roll-bending the upper portion 70d. Thus it is assured that the lower portion 70c of the bag body 70 is deployed more slowly than the upper portion 70d of the bag body 70. The bag body 70 is smoothly deployed rearwards without being displaced upwards, so as to assume its ultimate shape after completion of the deployment. Thus, it is possible to enhance the capability to restrain the movement of the passenger at the time of crash and to more reliably decrease the amount that the air bag rubs against the passenger.

The upper portion 70d of the bag body 70 is slightly longer than the lower portion 70c of the bag body 70, and the amount of the upper portion 70d folded to be accommodated in the case 64 is slightly larger than the amount of the lower portion 70c folded to be accommodated in the case 64. Thus, it is certain that the central rear face portion 70a is displaced rearwards substantially horizontally. Accordingly, it is possible to far more reliably decrease the amount that the air bag rubs against the passenger.

The above-described embodiment may be modified as follows. In this case, the same operation and effect can be achieved as in the aforementioned embodiment.

The lower portion 70c of the bag body 70 is roll-bent four times and the upper portion 70d of the bag body 70 is roll-bent twice. However, as illustrated in FIG. 17, the aforementioned embodiment may be modified such that the upper portion 70d of the bag body 70 is folded into a shape of bellows instead of being roll-bent and that the lower portion 70c of the bag body 70 is roll-bent twice. This modification also makes it possible to suitably control the rate at which the bag body 70 is deployed. Especially in this case, the upper portion 70d of the bag body 70 thus folded into a shape of bellows can be deployed faster than the roll-bent lower portion 70c of the bag body 70. This construction is highly advantageous in the case where the air bag apparatus is disposed to face upwards.

If necessary, the numbers of folding or roll-bending the lower and upper portions 70c and 70d of the bag body 70 may be altered. Even in this case, the aforementioned effect can be achieved.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An air bag apparatus for protecting, a passenger, comprising:

an air bag disposed in a vehicle compartment on a passenger side of an instrument panel;

an inflator supplying gas to the air bag for causing it to deploy; and a case disposed on a vehicle front side of the instrument panel so as to accommodate the air bag, wherein the air bag is folded such that when the air bag is deployed due to activation of the inflator, a passenger facing portion of the air bag that faces a passenger when the air bags is fully deployed, deploys earlier than other portions of the air bag, wherein the air bag is folded such that the portions of the air bag other than the passenger facing portion are deployed due to application of tension forces acting substantially in such a direction as to deploy the air bag, wherein upper and lower portions of the air bag are pushed against front and rear inner faces, respectively, of the case during deployment, wherein the air bag includes a bag body that is deployed due to activation of the inflator, a mouth portion for introducing gas supplied from the inflator into the bag body, and a fixture portion for fixing the air bag to the case, the fixture portion being wound around the inflator, wherein the mouth portion is disposed in a central portion of the case and substantially parallel with front and rear inner faces of the case, wherein the upper portion of the bag body located on a vehicle front side of the case relative to the mouth portion and the lower portion of the bag body located on a vehicle rear side of the case relative to the mouth portion are folded to be accommodated between the mouth portion and the front and the rear inner faces of the case, respectively, the upper portion and the lower portion being on opposite sides of the mouth portion, and wherein, regarding the upper portion of the bag body and the lower portion of the bag body, at least the lower portion of the bag body is folded in a bellows and roll-bent such that an end thereof is initially bent downward and drawn toward the mouth portion.

2. The air bag apparatus according to claim 1, wherein the upper portion of the bag body and the lower portion of the bag body are roll-bent such that respective front ends thereof are drawn toward the mouth portion.

3. The air bag apparatus according to claim 1, wherein the upper portion of the bag body and the lower portion of the bag body are folded in different manners to be accommodated between the mouth portion and the front and rear inner faces of the case respectively, such that the upper portion of the bag body and the lower portion of the bag body are deployed at different rates.

4. The air bag apparatus according to claim 3, wherein the upper portion of the bag body is folded into a shape of bellows to be accommodated between the mouth portion and the front inner face of the case and the lower portion of the bag body is roll-bent to be accommodated between the mouth portion and the rear inner face of the case.

5. The air bag apparatus according to claim 1, wherein the number of times the lower portion of the bag body is roll bent is greater than the number of times the upper portion of the bag body is roll-bent.

6. The air bag apparatus according to claim 1, wherein the case is disposed on a vehicle front side of the instrument panel and the upper portion of the bag body is slightly longer than the lower portion of the bag body, such that the amount of the upper portion of the bag body folded for accommodation in the case is larger than the amount of the lower portion of the bag body folded for accommodation in the case.

7. The air bag apparatus according to claim 6, wherein the upper portion of the bag body is folded into a shape of bellows to be accommodated between the mouth portion and the front inner face of the case and the lower portion of the bag body is roll-bent to be accommodated between the mouth portion and the rear inner face of the case.

* * * * *